United States Patent [19]
Cress

[11] Patent Number: 5,653,447
[45] Date of Patent: Aug. 5, 1997

[54] VACUUM/PRESSURE SEAL METHOD AND APPARATUS

[76] Inventor: Steven B. Cress, P.O. Box 30, Glenbrook, Nev. 89413

[21] Appl. No.: 507,758

[22] Filed: Jul. 26, 1995

[51] Int. Cl.⁶ .............................. F16J 15/32; F16L 55/10
[52] U.S. Cl. .................... 277/27; 277/1; 277/3; 277/226; 277/207 A; 277/207 R; 277/208; 215/270; 215/271
[58] Field of Search .................. 277/95, 1, 3, 27, 277/226, 208, 207 R, 207 A; 215/270, 271

[56] References Cited

U.S. PATENT DOCUMENTS

| | | | |
|---|---|---|---|
| 2,882,073 | 4/1959 | James | 277/208 |
| 3,048,415 | 12/1962 | Shook | 277/208 |
| 3,578,027 | 5/1971 | Zopfi | 277/208 |
| 4,343,480 | 8/1982 | Vassallo | 277/208 |

Primary Examiner—William A. Cuchlinski, Jr.
Assistant Examiner—Christina Annick
Attorney, Agent, or Firm—Herbert C. Schulze

[57] ABSTRACT

A vacuum/pressure seal method and apparatus including a closure for a vacuum/pressure chamber which includes the use of a flexible fin between the chamber and a closure member, which fin depends angularly toward the direction of greater pressure between a chamber opening surface and a closure member surface.

1 Claim, 2 Drawing Sheets

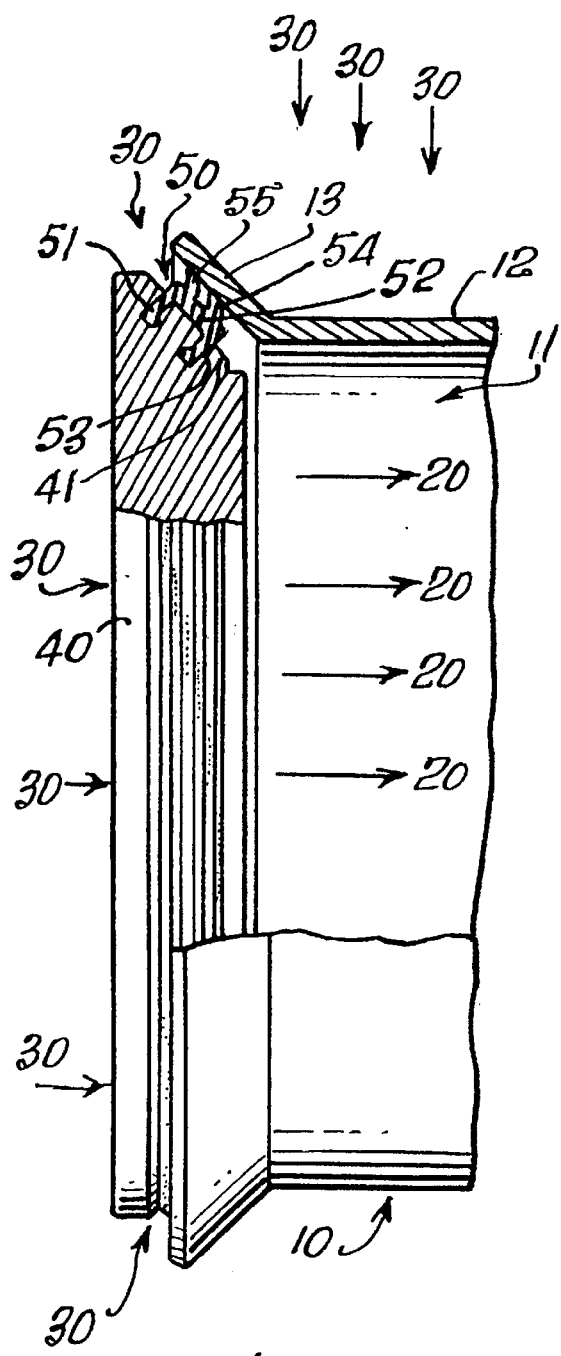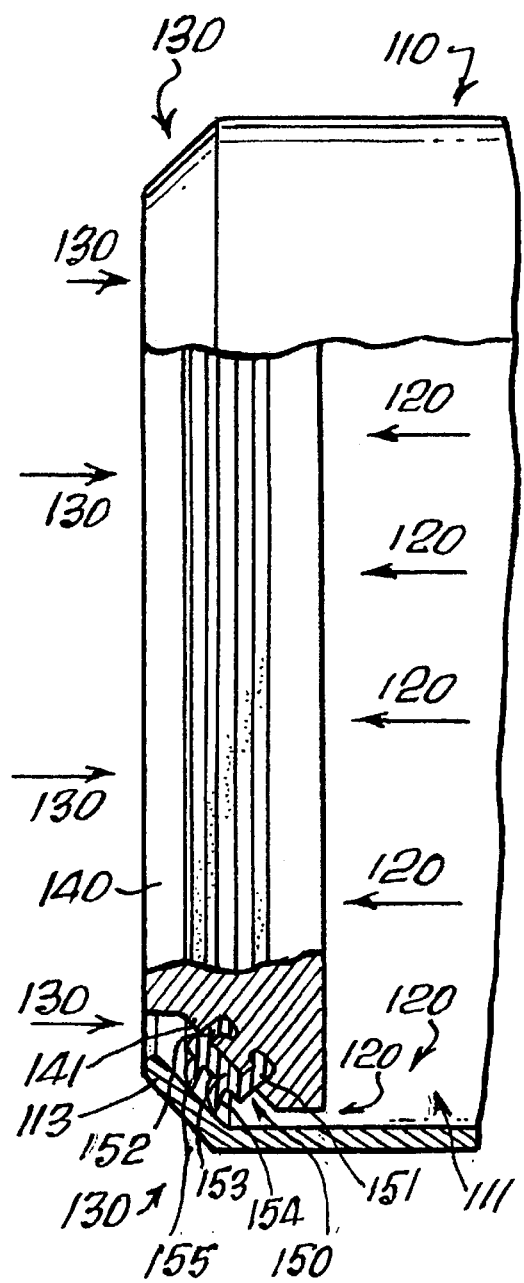

VACUUM/PRESSURE SEAL METHOD AND APPARATUS

CROSS REFERENCE TO RELATED PATENT APPLICATIONS

This application is not directly related to any other application filed by me except that it is in the field of vacuum/pressure chamber sealing, and a vacuum and pressure sealing method having some of the features of this invention is disclosed in my recently issued U.S. Pat. No. 5,416,967.

BACKGROUND OF THE INVENTION

I. Field of the Invention

This invention is in the general field of vacuum and pressure seals and the like;

The invention is more particularly directed to a unique vacuum and pressure chamber seal and method, wherein a flexible seal member seals between two rigid members; and The invention is even more particularly directed to an unusual tapering flexible seal member which becomes increasingly vacuum and pressure resistant as the vacuum or pressure increases.

II. Description of the Prior Art

There are many types of vacuum seals used under all types of vacuum conditions where a vacuum must be maintained in a chamber, conduit, or the like. Like wise there are pressure chambers where a tight seal is critical.

The present invention utilizes a new theory, wherein the force of the vacuum or pressure attempting to escape is utilized to increase the resistance to the escape of the vacuum or pressure.

So far as I have been able to research this appears to be a totally unique approach to this old problem. In that respect, there is really no prior art.

SUMMARY OF THE INVENTION

Vacuum and pressure chambers, conduits, and the like are used for many purposes known to those skilled in the art. Such purposes include, but are in no means limited to, vacuum chambers, pressure chambers, conduits depending upon vacuum or pressure, and the like.

All vacuum/pressure seals heretofore known operate in a similar fashion. In general, all previously known vacuum/pressure seals have relied upon a "brute force" theory in that the theory of making the seal is to force sealing elements together by an external force, such as clamps, bolts, or the like so as to create the sealing effect.

My present invention involves new and unique methods and apparatus in the above fields.

This patent application reveals a method and apparatus for utilizing the pressure differentials of a vacuum and/or pressure chamber, conduit, or the like to increase the effectiveness of a vacuum/pressure seal.

I accomplish this by providing a closure for a chamber, or the like, wherein a flexible, tapering, angularly disposed member is affixed to the periphery of the chamber in such manner that it contacts the closure so that the force of the vacuum or pressure source actually increases the sealing effect.

Alternately, the flexible, tapering, angularly disposed member is affixed to the closing member in such manner that it contacts the periphery of the chamber.

The seal effected by this method and apparatus is superior in another sense in that it allows for automatic adjustment to surface irregularities, warping, and the like, which normal gaskets and the like cannot accomplish.

In a very important form of this invention, I have provided a seal which can protect and seal against both pressure and vacuum. This may seem to be an odd statement in that both pressure and vacuum are always present in either a pressure or vacuum chamber. However, we must consider the very important situation where a given chamber is submitted to vacuum and pressure, alternately. By the appropriate alignment of seals of this invention, acting together against both conditions within the chamber, a perfect seal is made in a manner never conceived before.

I believe that this new seal is of particular value in connection with NASA objects, as it provides a superior seal for many possible applications under the rigorous demands of sealing space craft and other articles in the natural vacuum conditions in outer space and in the pressure conditions within various objects in space.

It is an object of this invention to provide a new and unique vacuum/pressure seal which seals more effectively as the vacuum/pressure increases;

Another object of this invention is to provide a vacuum/pressure seal which does not rely upon mechanically applied clamps, or the like, to achieve the desired sealing effect by means of excessive force applied.

The foregoing and other objects and advantages of this invention will be apparent to those skilled in the art upon reading the description of a preferred embodiment, which follows, in conjunction with reference to the appended drawings.

BRIEF DESCRIPTION OF THE DRAWINGS

FIG. 1 is a schematic, partially broken away, partially sectioned, side elevation of an apparatus suitable to practice the method of this invention on a vacuum chamber;

FIG. 2 is a schematic, partially broken away, partially sectioned, side elevation of an apparatus suitable to practice the method of this invention on a pressure chamber;

DESCRIPTION OF A PREFERRED EMBODIMENT

Figures 3, 4:
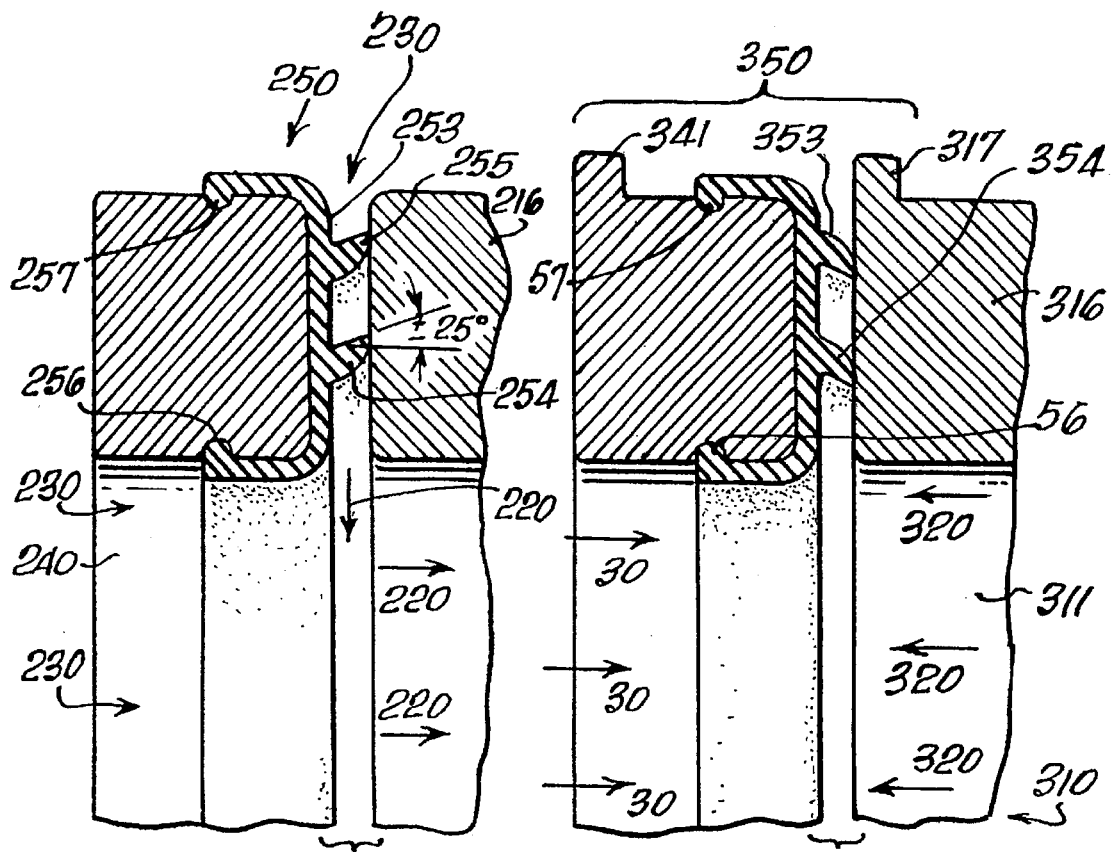
FIG. 3 is a schematic, partially broken away, partially sectioned, side elevation of an alternate apparatus suitable to practice the method of this invention on a vacuum chamber.
FIG. 4 is a schematic, partially broken away, partially sectioned, side elevation of an alternate apparatus suitable to practice the method of this invention on a pressure chamber.

FIG. 1 is a partially broken away, partially sectioned, schematic view of a vacuum chamber employing the features of this invention. As is illustrated, the interior 11 of a vacuum chamber, conduit, or the like, 10 is being constantly subjected to exterior pressures 30 resulting from interior suction 20 from vacuum being evacuated from the chamber interior 11.

Normally, the prior art has been directed to creating a pressure seal, by pressure of clamps, or the like, or tightened through bolts, etc. I have found this to be less than fully effective under conditions of extreme vacuum or pressure. Such seals can fail due to surface irregularities or warping between the vacuum/pressure chamber and the closure.

The outer shell 12 of the chamber terminates with an angularly disposed lip 13. The closure member 40 has an angularly disposed inner edge 41 and carriers a flexible sealing member 50, adhered to the closure member as shown at 51 and 52. The body 53 of the sealing member carries angularly disposed fins 54 and 55. As the pressure 30 increases, due to the suction 20, the fins 54 and 55 tend to be drawn into a constantly increasing pressure on the inside of the lip 13.

In FIG. 1, the chamber is illustrated as being tubular, with a round cross section. It is to be understood that the same principle will apply to other shapes, such as a globe, rectangular or oval cross section, or the like.

It is to be noted that two fins 54 and 55 are illustrated in FIG. 1. It is noted that it is possible to practice this invention with only one such fin, or virtually any member of fins.

FIG. 2 is a view similar to FIG. 1, but as to a pressure chamber. In this case, there is a pressure chamber 110 with its interior 111 shown to be subjected to pressures 120 with the lower exterior pressure at 130. The chamber walls 112 terminate at the opening with an inwardly angularly disposed lip 113. Closure member 140 has an angularly disposed edge 141, as shown. The edge carries sealing member 150 as shown, with angularly disposed fins 154 and 155 depending as shown from the sealing member main body 153. It is noted that, preferably, the fins taper slightly from the base member 153, becoming less wide at the extremity.

As with the vacuum chamber of FIG. 1, the chamber is illustrated as being tubular, with a round cross section. It is to be understood that the same principle will apply to other shapes, such as a globe, rectangular or oval cross section, or the like. If it is desired to remove the closure from the chamber, this can be accomplished by forming the chamber, or at least the opening and the closure, in an oval shape wherein the closure can be turned so the smaller diameter of the oval closure will pass through the larger oval opening.

As with the vacuum chamber of FIG. 1, two fins 154 and 155 are illustrated in FIG. 2. It is noted that it is possible to practice this invention with only one such fin, or virtually any number of fins.

While the ideal apparatus for practicing the method of this invention is as shown in FIGS. 1 and 2, alternatively a vacuum chamber or the like may be sealed using this method without the use of the lip on the chamber, as is shown in FIG. 3.

FIG. 4 shows, importantly, how this seal may be used on a pressure chamber, such as, for example, only, an internal combustion head gasket, or the like. In FIG. 4 we have the basic device 310 with the pressure chamber 311. Pressure is exerted as shown by the various arrows 320. The cover element 340 has a lip 341, sealing member 353 fastened at 356 and 357, and with sealing tabs 353 and 354. The pressure chamber body 316 has a lip 317 as shown.

In the embodiment of FIG. 4, bolts, clamps, or the like, will be applied at 350 holding lips 341 and 317 and, thus, holding the cover 340 against the wall 316 of the pressure chamber as will be understood by those skilled in the art. There may be several such bolts or clamps. Two bolts or clamps at 180 degree relation may do. In general three such bolts or clamps will be most desirable at a 120 degree relation to each other, if round. Other combinations can be easily calculated with other cross sections. It will not be necessary to tighten the clamps or bolts excessively, as the seal is most effective when relying upon the natural distortion and sealing effect of the pressure differential between the chamber and the closure.

In the case of the embodiment of FIG. 3, the vacuum chamber 210 with its wall 216 and interior chamber 211 is supplied with closure 240 which carries the sealing member 250 held on the closure member as shown by nubs 256 and 257. The main body 253 of the sealing member carries fins 254 and 255 configured as shown. The vacuum suction 220 is shown to be evacuating the chamber and causing the exterior pressure 230 to effect the seal desired.

I have found that an ideal angular relationship if the fins to the main body of the sealing member is 25 degrees from vertical in the direction of the higher pressure side of the chamber.

Figure 5:
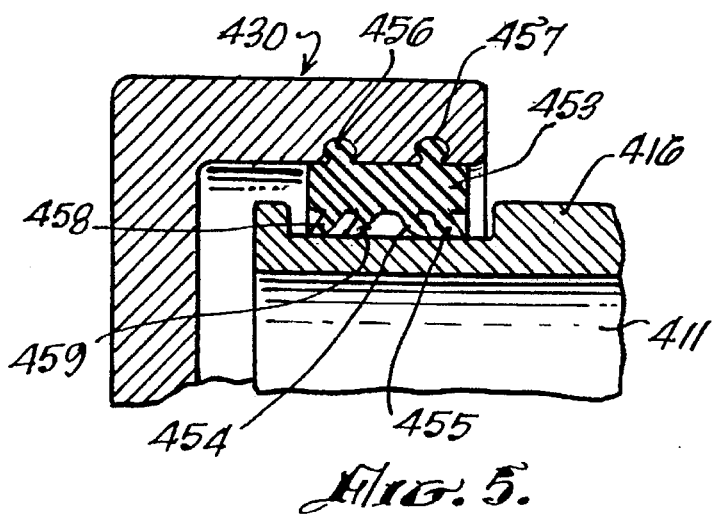
FIG. 5 is a schematic, partially broken away, partially sectioned, side elevation of an alternate apparatus suitable to practice the method of this invention on a chamber subjected alternately to vacuum and pressure.

We must now pay special attention to FIG. 5. This may be the most important embodiment of this invention. In this case the chamber 411 is alternately subjected to internal pressure and vacuum conditions. At its throat, it has, preferably, a reduced wall thickens as shown. A cap, 430 is indicated surrounding the exterior 416 of the chamber 411. A sealing member 453, secured to the cap at 456 and 457. The member 453 has fin members 454 and 455 and 458 and 459 as shown. The unusual and unanticipated result of this embodiment is that pressure or vacuum in the chamber cannot dislodge the cap 430. If there is vacuum in the chamber 411 the fins 458 and 459 will effectively hold the cap in place. If there is pressure in the chamber 411 the fins 454 and 455 will prevent the removal of the cap. The lip shown on the chamber wall reduced area may even be eliminated, although it may be considered a safety precaution. Also, it is not even necessary that there be reduced area, so long as the exterior surface of the chamber is relatively smooth.

In the embodiment of FIG. 5, it can be seen that regardless of the conditions in the chamber, those conditions will be retained by the use of this sealing arrangement, something never before achieved, or even conceived.

The effect of this is such an advance as to be astounding. The use of this invention will result, particularly in space, advanced weaponry, and the like, in an advance which will obsolete previous systems for NASA, the Department of Defense, and numerous other users. It will, also, gain an advantage over all developments of this nature through out the world.

While the embodiments of this invention shown and described are fully capable of achieving the objects and advantages desired, such embodiments are show for purposes of illustration, only, and not for purposes of limitation.

I claim:

1. The method of sealing a closure in a chamber subject to pressure and/or vacuum, comprising: supplying such a chamber with a sealable exterior opening; supplying a closure member for said chamber; supplying at least two flexible fins in contact with the chamber opening and the closure, a first of which fins is angularly disposed toward the chamber opening and a second of which fins is angularly disposed away from said chamber opening; alternately evacuating and pressurizing said chamber causing pressure against said fins in contact with the chamber and the closure.

* * * * *